March 25, 1952

E. O. SCHONSTEDT 2,590,131

ANCHORING AND CONNECTING MEANS FOR
STRAIN-CORED ELECTRICAL CABLES

Filed June 5, 1946

Inventor
E. O. SCHONSTEDT

By M. A. Hayes

Attorney

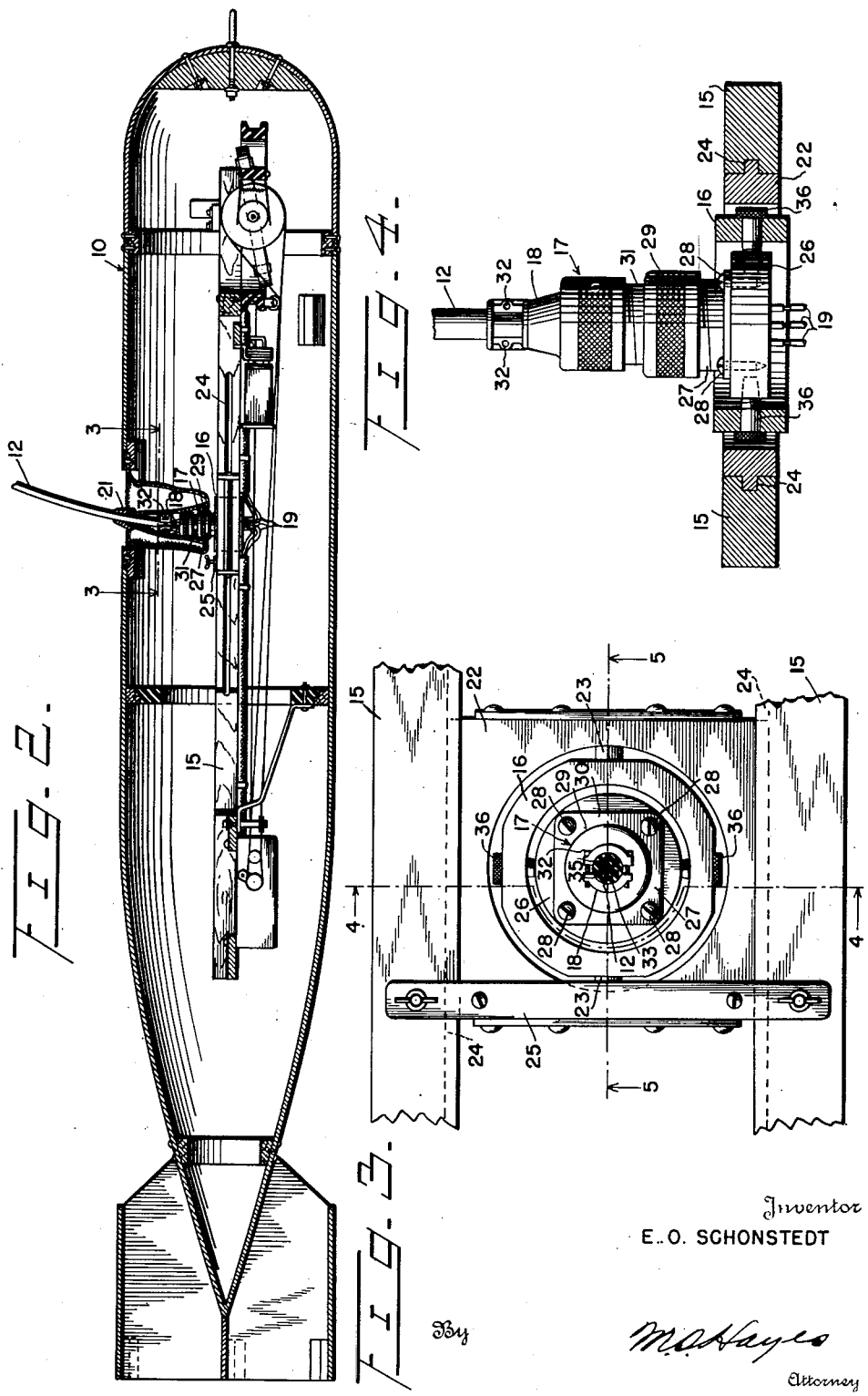

March 25, 1952     E. O. SCHONSTEDT     2,590,131
ANCHORING AND CONNECTING MEANS FOR
STRAIN-CORED ELECTRICAL CABLES Filed June 5, 1946     4 Sheets-Sheet 3

Inventor
E. O. SCHONSTEDT

March 25, 1952 E. O. SCHONSTEDT 2,590,131
ANCHORING AND CONNECTING MEANS FOR
STRAIN-CORED ELECTRICAL CABLES
Filed June 5, 1946 4 Sheets-Sheet 4

Inventor
E. O. SCHONSTEDT

By
M. E. Hayes
Attorney

UNITED STATES PATENT OFFICE 2,590,131

ANCHORING AND CONNECTING MEANS FOR STRAIN-CORED ELECTRICAL CABLES

Erick O. Schonstedt, Minneapolis, Minn.

Application June 5, 1946, Serial No. 674,408

7 Claims. (Cl. 174—1)

(Granted under the act of March 3, 1883, as amended April 30, 1928; 370 O. G. 757)

This invention relates to new and improved means for suspending and towing an aerodynamic body from an aircraft by means of a strain-cored electrical towing cable therefor, means also being useful in connecting lengths of electrical cable including strain members so that the tension in the cable is transferred through a plug connector from one cable strain member to the strain member of another length of cable. More specifically, the invention relates to means for attaching an electrical cable having a strain member therein to one portion of a conventional plug connector whereby the shell thereof supports the tension within the cable in detachable relation to a matching plug connector, thereby to facilitate ready connection and disconnection of lengths of cable from each other or from a plug attached to a supporting structure.

In the towing of airborne magnetic detectors for surveying irregularities of magnetic field associated with subterranean bodies of ore or other hidden magnetic objects it is found desirable to enclose the magnetic detectors in a housing of smooth symmetrical shape, and to carefully stabilize the body for flight in order that the flight of the body will be steady and smooth. For this purpose the body is supported by a cable which includes electrical conductors for transmitting signals, and a strain member by which the body is supported and towed. This strain member is most advantageously attached to the body by gimbals in such a manner that fortuitous changes in towing angle between the cable and the body do not communicate upsetting forces to the body. It is also advantageous to attach the gimbals at a predetermined point within the body above the center of gravity thereof and to attach the strain member of the cable at the center of the gimbals. This invention further provides means for attaching both the electrical cable and the strain member of the cable to the gimbals employing a modified conventional plug connector in such a manner that the connection of the cable to the gimbals may be easily and reliably made, the strain member of the cable supporting the body through the shell portions of the plug connector.

Whenever an electrical cable is required to withstand considerable tension it is advantageous to include with the electrical conductors comprising the cable an additional member of steel, phosphorus bronze or other high tensile strength material which will withstand the forces of tension and thereby relieve the soft copper conductors of the strain which would otherwise be likely to break the conductors. By this means hidden breaks in the conductors are largely prevented and a cable sufficiently strong for the purpose at hand is obtained. This strain member or strain core is conveniently disposed at the center of the cable and the electrical conductors are disposed about this strain member. A covering of rubber or other suitable wear-resistant insulation material is then ordinarily formed about the electrical conductors to complete the cable.

Another means for providing a strain member in such a cable is to dispose the electrical conductors at the center of the cable and to form the strain member of several strands of high tensile strength material about the electrical conductors in such a manner that tension in the strain member does not cause the strain member to collapse upon or damage the electrical conductors. Such a strain member may be designated a strain shell. A strain shell of high tensile strength is obtained in this manner in which the strain member serves as armor protecting the electrical conductors.

In either of the methods of including a strain member in an electrical cable there is the problem of securing the ends of the strain member to the supporting structure or to the strain member of a second cable. In previous practice it has been customary to secure the strain member permanently to the supporting structure or to the second length of cable to which it is joined and considerable time and trouble are encountered in making such connections, particularly where it has been found necessary to separate the strain portion from the electrical portion of the cable and individually anchor or attach the separated portions.

One object of this invention is to provide a simple and reliable connection between a strain-cored towing cable and an aerodynamic body in which the electrical conductors and the strain member of the cable are attached at the center of the gimbals.

Another object of the invention is to provide a means of connecting a length of cable including a strain member to a plug connector whereby the strain is transferred from the cable to the plug through the shell of the plug, thence to the support on which the plug is mounted or to a connecting cable.

Another object of the invention is to provide means for securing the strain member of a cable to that portion of the plug to which the cable end is permanently attached.

Still another object of the invention is to provide a simple and efficient connection between a strain core and a connector plug therefor which is economical to manufacture, reliable in use, and readily assembled.

Other objects, advantages and improvements will be apparent from a consideration of the following description, taken in connection with the accompanying drawings, in which like numerals of reference are employed to designate like parts throughout the several views and in which:

Fig. 2 is an enlarged sectional view of the body of Fig. 1 showing the attachment of the cable to the body through a plug connector attached to gimbal rings;

Fig. 3 is a plan view of the attachment of the gimbals to the frame of the body and the attachment of one of the plug members to the inner gimbal ring;

Fig. 4 is a view taken along line 4—4 of Fig. 3 and further shows the attachment of the cable to the frame of the aerodynamic body by means of the plug connector and gimbal rings;

Figure 8:
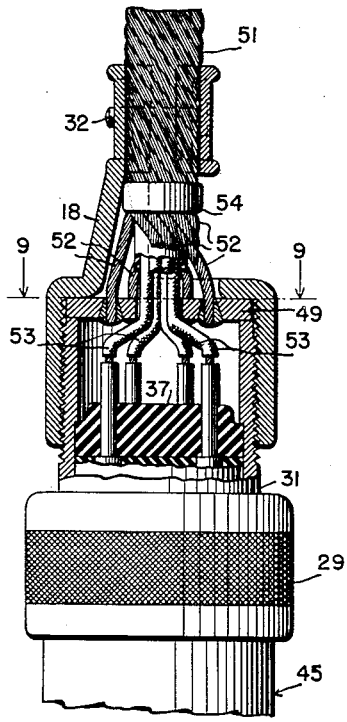
Figure 9:
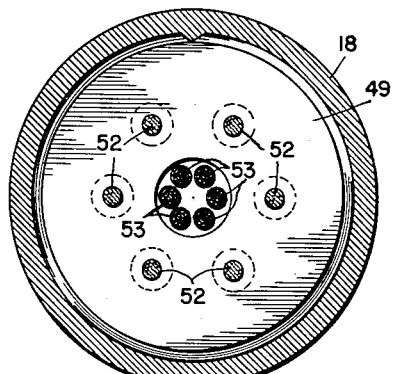

Fig. 8 is a sectional view of an alternative form of this invention in which an external strain member or a strain shell is shown anchored within a plug member by means of a strain disk; and Fig. 9 is a cross sectional view taken along line 9—9 of Fig. 8 and showing a means of anchoring the strands of the strain shell of the cable within the strain disk and showing the electrical conductors passing through a central aperture in the disk.

Figure 1:
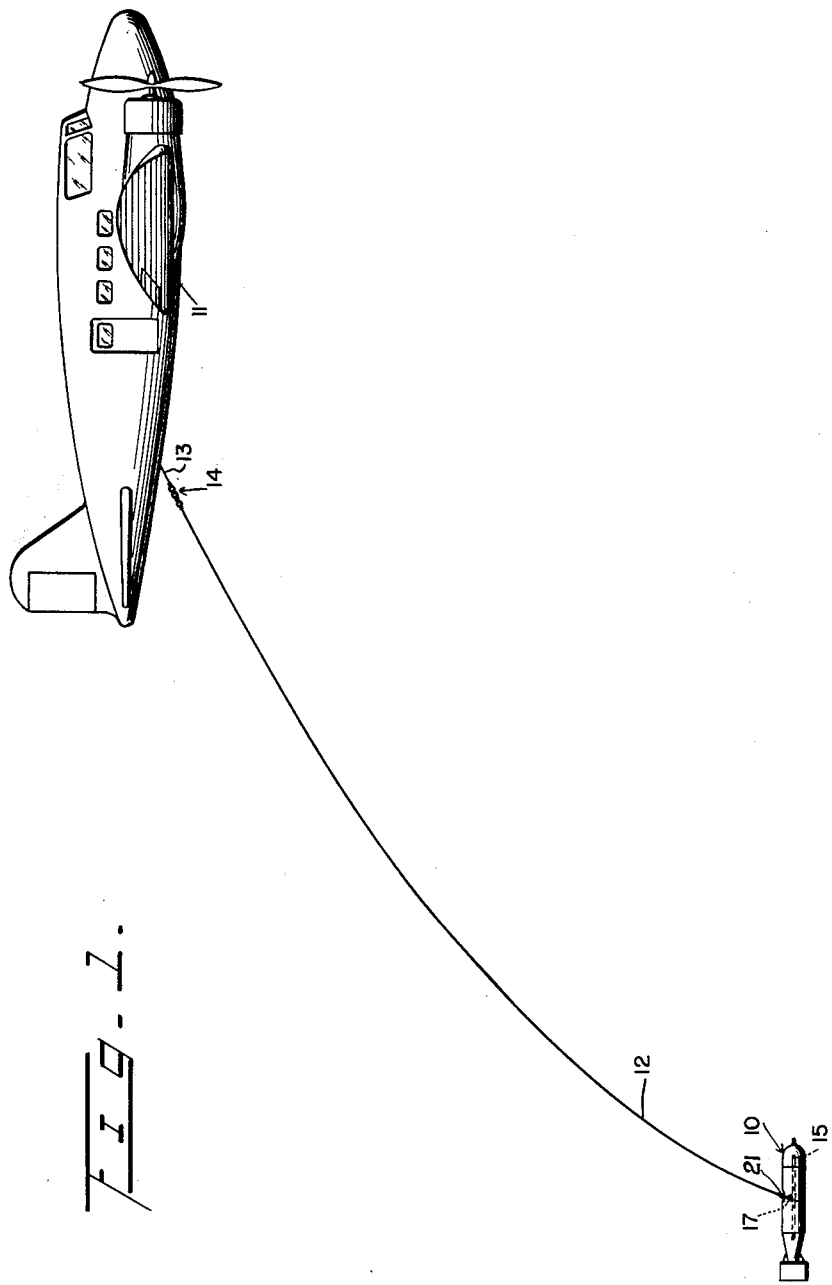
Fig. 1 is a general view of a system for detecting magnetic fields in which an aircraft is shown towing a body carrying the detecting apparatus by means of a cable attached to the airplane and to the body in accordance with this invention.

Referring now to the drawings for a more complete understanding of the invention and more particularly to Fig. 1 thereof, 10 indicates generally the aerodynamic body within which the magnetic detector is disposed, 11 indicates generally the supporting airplane within which the master controls for the detector are located, 12 indicates generally the towing cable anchored within the body 10 by means of a plug connector assembly 17, Fig. 2, and suspended from the plane by a length of cable 13 attached to the towing cable by a cable connector generally indicated by 14.

In Fig. 2 is shown in section the aerodynamic body having therein suitable detecting and control apparatus mounted upon a frame 15 which is secured within the body 10. The cable 12 enters the body through an aperture in the upper surface of the body and is attached to a gimbal ring 16 which is secured to the frame 15, the connection of the cable 12 to the gimbal ring 16 being made by means of the plug connector assembly 17. The strain member of the cable 12 is secured to the plug assembly 17 by means of an anchoring ring or strain disk within the cable clamp 18 when the clamp 18 is secured to the plug assembly 17 by a threaded connection, as more clearly appears in Figs. 5 and 6. The opening in the upper surface of the body is closed by means of a flexible boot 21 attached to the cable 12 and to the body at the edges of the aperture therein.

Fig. 3 illustrates a means of attaching the gimbal ring 16 to the frame 15 by means of the mounting plate 22, bearings 23, grooved slots 24 in the frame 15 and a suitable clamping fixture 25 which secures the mounting plate in a fixed position along the frame 15. An inner gimbal ring 26 is mounted within the first gimbal ring 16 by means of the bearings 36, thereby completing the gimbal structure. Permanently secured to the inner gimbal ring 26 is a plug member 27 having a square mounting flange 30 by which the plug member is secured to the ring 26 by the screws 28. The electrical conductors 19 from the plug member 27 of the plug assembly 17 emerge beneath the gimbal ring, as more clearly shown in Fig. 5. Thus it is seen that the shell of the plug member 27, which is of strong metallic construction, is firmly secured to the gimbal assembly and thence to the frame 15 within the body in a manner suitable for suspending or towing the body. The central axis of the plug member 27 is free to change orientation with respect to the frame 15 depending upon the direction of the supporting or towing force with respect to the frame 15.

Fig. 4 further illustrates the attachment of the plug member 27 to the mounting plate 22 and the frame 15 by means of the gimbal rings 16 and 26 and the screws 28. The plug member 27 which is attached to the ring 26 is externally threaded and is shown to be engaged by the collar or thimble 29 which is turned thereupon in threaded relationship for securing the plug member 31 to the plug member 27, as is more clearly shown in Fig. 5. The plug member 31 may be externally threaded as illustrated and is engaged by the cable clamp 18. After the clamp 18 has been secured to the plug member 31 by the screw connection indicated, the screws 32 of the clamp are tightened in order to engage the cable 12 firmly therein.

Figure 5:
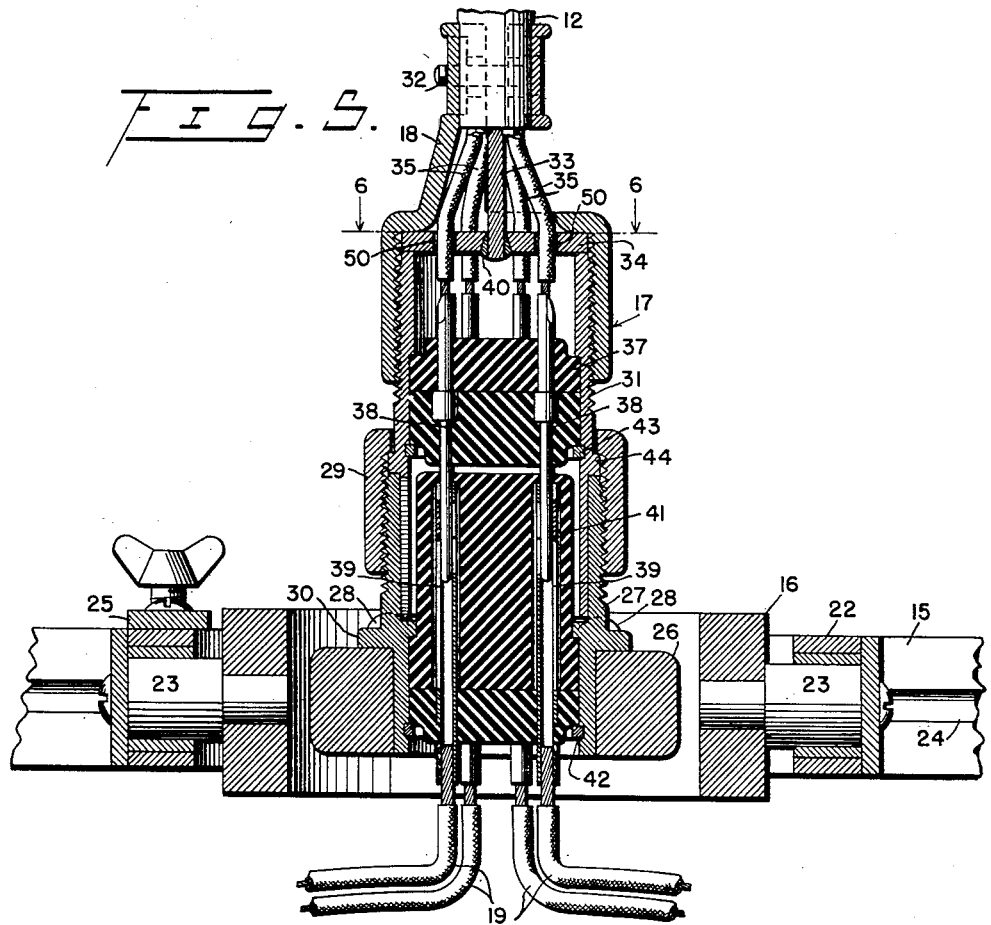
Fig. 5 is a sectional view taken along the line 5—5 of Fig. 3 showing the two plug members in the assembled and locked position and further showing the attachment of the plug to the inner gimbal member.

In Fig. 5 is shown in greater detail the construction of the plug members 27 and 31 and means for making electrical connection therein and for securing the strain member 33 of the cable 12 within the plug member 31 by means of the anchoring ring or strain disk 34 which is secured to the plug member 31 by screwing the cable clamp 18 thereupon. The plug member 31 is externally threaded for the purpose of receiving the cable clamp 18. The end of the metallic portion of the plug member extends beyond the prongs 38. The cable clamp is an internally threaded metallic shell having therein a shoulder suitable for bearing against the end of the plug member 31. The strain disk 34 is constructed of metal suitable for the purpose and has therein holes for receiving the strain member of the cable and for passing the cable conductors therethrough. In the case of a cable having a central strain member or strain core such as 33 a central aperture 40 in the disk 34 is provided of size barely sufficient to permit the strain core to be passed through it. This aperture is conveniently beveled in order that the strain core, after inserting therein, may be spread by peening or secured therein in any other suitable manner such as by brazing or soldering. The beveled edge of the aperture assists in maintaining a strong and rigid connection between the strain core and the strain disk. The electrical conductors may be passed through suitable openings 50 within the strain disk conveniently arranged for that purpose. The cable clamp is ordinarily placed upon the cable before the strain disk is secured to the strain core after which the electrical conductors may be secured respectively, to the prongs in the plug member 31. The cable clamp is then screwed onto the plug member 31 so that the strain disk 34 is clamped securely between the cable clamp and plug member 31. The screws 32 are then tightened so that the cable will be firmly secured in a central or axial position with respect to the cable clamp.

The interior portion of the plug member 31 is of conventional design and is provided with a suitable number of prongs arranged within an insulating member 37 which is secured within the shell of the plug member 31 between a shoulder thereof and the retaining ring 43. The prongs 38 are arranged in matching relation to the prong sockets 39 of the plug member 27. The plug member 31 may be inserted in the plug member 27, and the prongs 38 then engage the sockets 39 of the plug 27. The plug members as assembled in this manner are retained in the assembled position by turning the collar or thimble 29 upon the plug member 27 as illustrated in Fig. 5. The collar 29 engages the shoulder 44 on the plug member 31 and holds it firmly in position against the end of the plug member 27.

In Fig. 5 the inner gimbal ring 26 has an internal diameter slightly larger than the diameter of the plug member 27, which is shown inserted therein and secured thereto by the flange 30 and the screws 28. The insulating member 41 contains the prong sockets 39 and is held in position within the plug by means of the retaining ring 42. The conductors 19 are ordinarily soldered to the ends of the prong sockets and insulated from each other by terminal boots, tape or in any other suitable manner.

Figure 6:
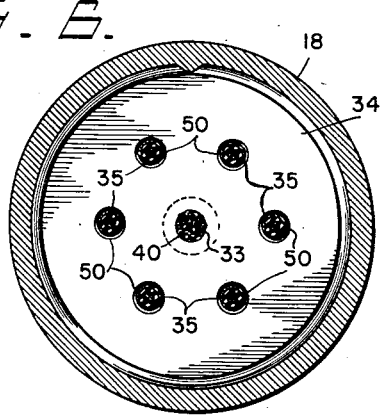
Fig. 6 is a cross sectional view taken along line 6—6 of Fig. 5 and showing the anchoring means for the strain member within the upper plug member.

In Fig. 6 is shown the arrangement of the strain disk 34 within the circular portion of the cable clamp 18. The strain core of the cable is shown secured centrally therein and the conductors 35 are shown passing freely through holes conveniently arranged within the disk 34 for that purpose.

Figure 7:
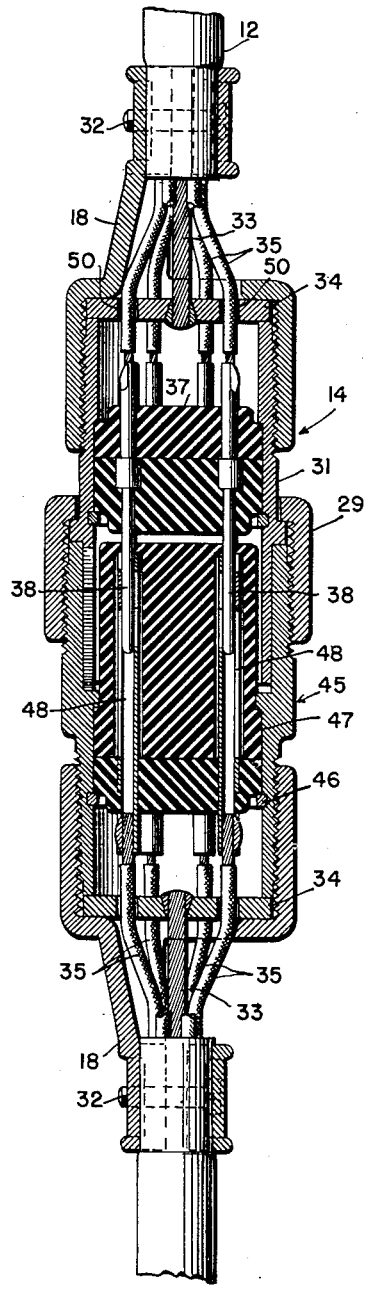
Fig. 7 is a sectional view of two plug members in the assembled and locked position showing two cable members each having strain cores and electrical conductors operatively connected to the plug members.

Fig. 7 illustrates the interconnection of two lengths of strain-cored cable by means of two plug connector members attached respectively thereto, of which the plug member 31 is arranged in the same manner as in Fig. 5. The plug member 45 is functionally and structurally similar to the plug member 31 except that the member 45 contains an insulating member 47 similar to the insulating member 41 of Fig. 5 and has prong sockets 48 similar to the prong sockets 39 of Fig. 5. The retaining ring 46 holds the insulating member 47 in position within the plug member 45. A cable clamp 18 similar to the cable clamp of Fig. 5 engages the plug member 45 in the same manner as in Fig. 5. The strain disk 34 engages the strain core 33 of the first length of cable and is secured to the plug member 45 as previously described in connection with plug member 31. The plug assembly illustrated in Fig. 7 is suitable for connecting together two similar strain-cored cables in such a manner that they may be quickly connected or disconnected. The tension within the strain core is transmitted through strain disk 34 and the cable clamp 18 to the plug member 45, thence through collar 29 to the plug member 31, thence through cable clamp 18 to the strain disk 34 and the strain core 33 of the second length of cable.

In Fig. 8 an additional embodiment of this invention is shown which is suitable for connecting together lengths of armored cable or for connecting an armored cable to a fixed support by means of a plug member such as 27 of Fig. 5. In this arrangement the strain member or armor portion of the cable is arranged on the outside of the cable and a strain disk such as 49 is provided in which the strands 52 of the strain member are secured to the strain disk 49 as shown in Fig. 9. In this instance the conductors 53 emerge centrally from the cable and pass through a central aperture in the strain disk 49 and the strands 52 engage the disk 49 within beveled holes suitably arranged around the central aperture. Each strand is conveniently anchored in the strain disk by peening, brazing or soldering. The armored cable is indicated generally by 51 and is shown secured within a cable clamp 18 similar to that of Fig. 5. The external strands of the armor or the strain member of the cable are prevented from separating or untwisting by a suitable serving of wire or a clamping band such as 54. After the strain disk 49 has been secured to the plug member 31 by the screw connection between the cable clamp and the plug member 31 the screws 32 are tightened sufficiently to secure the cable in a position such that its axis within the clamp coincides with the axis of the plug member.

In Fig. 9 is shown a plan view of the strain disk 49 within the cable clamp 18 in which the electrical conductors 53 are shown passing centrally through the disk 49 and the strands of the strain member are secured within beveled holes conveniently arranged about the central aperture.

By the structure described and illustrated it may be seen that armored cables or cables having strain cores may be easily and quickly connected together in supporting relation to each other or used as detachable suspending means for ponderous apparatus in combination with electrical leads thereto. Conventional connector plug assemblies of various manufacture are utilized in combination with the anchoring means herein described and illustrated. By the means disclosed a convenient and reliable connection is made between the towing cable and towed field responsive detecting apparatus in which a cable connector provides a readily detachable connection between the strain member of a cable and the center of a pair of gimbals supporting the towed body which houses the detecting apparatus, and electrical connections are greatly facilitated.

While the invention has been described in detail with respect to certain examples thereof which give satisfactory results, such examples including the suspending and towing of magnetic detection apparatus through a gimbaled connection between the cable and the towed body, the invention is obviously not so limited and may be employed with advantage in the suspending or towing of any apparatus employing strain-cored cables. Furthermore, as disclosed hereinbefore, the invention may be employed advantageously in the connecting together of a number of lengths of cable in which metallic strain members of high tensile strength are included.

While the invention has been described with reference to a particular strain disk adapted to be used in a particular type of metallic shell connector, it will be apparent to those skilled in the art, after understanding this invention, that various changes and modifications may be made without departing from the spirit and the scope of the invention and it is intended, therefore, in the appended claims to cover all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. In an airborne magnetic detecting apparatus adapted to be supported horizontally and stably beneath an aircraft in flight, the combination of an aerodynamic body for enclosing said apparatus and having a frame for supporting the apparatus, and means including said frame for supporting the body horizontally in stable flight below the aircraft at a point substantially at the center of form, along the vertical center line and above the center of gravity of the body, said body supporting means comprising a cable including a strain core secured to said aircraft and having a plurality of conductors arranged thereabout for transmitting signals between the aircraft and the apparatus, a gimbal assembly including an outer ring pivotally mounted in said frame and an inner ring thereof pivotally mounted within the outer ring such that the rings pivot on axes which intersect at said point of support, a first connector member secured to said inner ring, a second connector member secured to said first connector member and to said strain core, said connector members being constructed and arranged for passing said conductors therethrough adjacent said point of support and into said detecting apparatus whereby signals detected by said apparatus are communicated through said conductors to said aircraft.

2. In airborne detecting apparatus adapted to be towed horizontally below and controlled from an airplane, the combination of an aerodynamic body enclosing said detecting apparatus and balanced horizontally for stable flight when supported from a point substantially at the center of form, on the vertical center line and above the center of gravity of the body, a cable comprising a stranded metallic strain member secured to said airplane and having a plurality of electric conductors arranged around the said strain member, a gimbal ring assembly having the outer ring thereof pivotally attached to the frame of the body and the iner ring thereof pivotally mounted within the outer ring such that the rings are pivoted about axes which intersect at right angles at said point of support, a first cable connector member secured to said inner ring, and a second cable connector member secured to said strain member and detachably secured to said first connector member and constructed and arranged for passing said conductors through said cable connector members adjacent said point of support and into said detecting apparatus.

3. In an airborne magnetic detecting apparatus adapted to be supported and towed horizontally in stable flight from an airplane by a towing cable including signal conductors and a stranded metallic strain core secured to the airplane, the combination of an aerodynamic body for enclosing said apparatus, a pair of gimbal rings arranged one within the other and pivotally secured to the body by the outer one of the rings at a position within said body with the pivot center of the gimbal rings arranged substantially at the center of form of the body and at a predetermined point along the vertical longitudinal center line thereof whereby said body is supported horizontally for stable flight below said airplane, and means including a plug connector assembly secured to the inner gimbal ring and to said strain core in coaxial relation therewith for electrically connecting said signal conductors to conductors from said detector.

4. Apparatus for towing a detecting mechanism from an aircraft in flight comprising, in combination, an aerodynamic body for enclosing said mechanism, said body being balanced horizontally for stable flight and supported at a point substantially at the center of form of the body on the vertical center line and above the center of gravity thereof, a cable including a strain member supported by said aircraft and having a plurality of conductor members arranged about said strain member, a gimbal assembly including an inner ring and an outer ring pivotally mounted in said body and having the intersection of the axes of pivot thereof arranged in registry with said point of support of said body, first and second tubular members arranged in axial alignment with each other, said first tubular member being secured to said inner ring concentrically therewith, means for detachably securing said second member to said first member, a disk disposed within said second member and secured therein by said first member, said disk having a plurality of eccentric openings for passing said conductors individually therethrough and through said first and second tubular members into said body, and means for securing said strain member to the central portion of said disk.

5. Apparatus for towing a detecting mechanism from an aircraft in flight comprising, an aerodynamic body for enclosing said mechanism, a cable including a strain core secured to the aircraft, and a plurality of electric conductors arranged about said strain core, a gimbal assembly mounted in said body and including an outer ring and an inner ring mounted for pivotal movement about axes which intersect at a point substantially at the center of form, along the vertical center line and above the center of gravity of said body in a manner to support said body horizontally in stable flight, a first tubular member secured to said inner ring concentrically therewith and at right angles to the axis of pivot thereof, a second tubular member detachably secured to said first tubular member, and a disk secured to said second tubular member and to said strain core concentrically therewith, said disk having a plurality of eccentric openings for passing said conductors therethrough and through said first tubular member into said body whereby said body is suspended below said aircraft and away from the air turbulence produced thereby and towed on said strain core without putting said conductors under tension.

6. Apparatus for towing a detecting mechanism from an aircraft in flight comprising, in combination, an aerodynamic body for enclosing said mechanism, a cable including a strain member secured to the aircraft and having a plurality of conductors arranged thereabout, a gimbal assembly mounted in said body and including an outer ring and an inner ring having their pivotal axes arranged to intersect substantially at the center of form, above the center of gravity and along the vertical axis of the body whereby at a point said body is balanced horizontally for stable flight, a first tubular member secured to said inner ring with the longitudinal axis thereof arranged at right angles to the pivotal axis of the inner ring and concentrically therewith, a second tubular member secured to said first tubular member and the outer casing of said cable, and a disk secured to said strain core and detachably secured to said second tubular member, said disk having a plurality of openings for passing said conductors therethrough and through said first tubular member into said body.

7. In a device of the character disclosed for towing a magnetic detecting device in stable flight, the combination of an aerodynamic body enclosing said device, a gimbal mechanism pivotally secured to said body, said gimbal mechanism including an outer ring and an inner ring having the axes of pivot of said rings intersect at a point in said body substantially at the center of form, above the center of gravity and on the vertical axis of the body such that the body is balanced on said gimbal mechanism for stable flight, a connector secured to one of said gimbal rings, a cable including a strain member and a plurality of electric conductors arranged about the strain member, means for securing said connector to said strain member for towing said body by said strain member, and means including a plurality of slip connections arranged within said connector for establishing electrical connections individual to said conductors.

ERICK O. SCHONSTEDT.

REFERENCES CITED

The following references are of record in the file of this patent:

UNITED STATES PATENTS

| Number | Name | Date |
|--------|------|------|
| 469,050 | Weeks | Feb. 16, 1892 |
| 1,152,005 | Clark | Aug. 31, 1915 |
| 1,690,578 | Hammond | Nov. 6, 1928 |
| 1,705,075 | Stoddard | Mar. 12, 1929 |
| 1,944,196 | Saraceno | Jan. 23, 1934 |
| 2,092,435 | Troisi | Sept. 7, 1937 |
| 2,331,409 | Markey | Oct. 12, 1943 |
| 2,371,551 | Schmitt | Mar. 13, 1945 |
| 2,385,392 | Van Dusen | Sept. 25, 1945 |
| 2,389,132 | Borgelt | Nov. 20, 1945 |

FOREIGN PATENTS

| Number | Country | Date |
|--------|---------|------|
| 295,149 | England | Aug. 9, 1928 |